United States Patent
Wei et al.

(10) Patent No.: US 11,239,706 B2
(45) Date of Patent: Feb. 1, 2022

(54) WIRELESS CHARGING RECEIVING DEVICE, WIRELESS CHARGING METHOD AND SYSTEM, AND TERMINAL DEVICE

(71) Applicant: VIVO MOBILE COMMUNICATION CO.,LTD., Guangdong (CN)

(72) Inventors: Huabing Wei, Chang'an Dongguan (CN); Dong Chen, Chang'an Dongguan (CN)

(73) Assignee: VIVO MOBILE COMMUNICATION CO., LTD., Chang'An Dongguan (CN)

( * ) Notice: Subject to any disclaimer, the term of this patent is extended or adjusted under 35 U.S.C. 154(b) by 0 days.

(21) Appl. No.: 16/981,250

(22) PCT Filed: Mar. 4, 2019

(86) PCT No.: PCT/CN2019/076885
§ 371 (c)(1),
(2) Date: Sep. 15, 2020

(87) PCT Pub. No.: WO2019/174491
PCT Pub. Date: Sep. 19, 2019

(65) Prior Publication Data
US 2021/0050748 A1 Feb. 18, 2021

(30) Foreign Application Priority Data
Mar. 16, 2018 (CN) .......................... 201810218789.6

(51) Int. Cl.
*H02J 50/70* (2016.01)
*H02J 50/80* (2016.01)
(Continued)

(52) U.S. Cl.
CPC ............ *H02J 50/70* (2016.02); *H02J 50/005* (2020.01); *H02J 50/10* (2016.02); *H02J 50/80* (2016.02)

(58) Field of Classification Search
CPC .. H02J 50/70; H02J 50/80; H02J 50/10; H02J 50/005
(Continued)

(56) References Cited

U.S. PATENT DOCUMENTS

2015/0349537 A1 12/2015 Milne et al.
2019/0140470 A1* 5/2019 Wan .......................... H02J 7/00

FOREIGN PATENT DOCUMENTS

CN 203014464 U 6/2013
CN 103944243 A 7/2014
(Continued)

OTHER PUBLICATIONS

Chinese Office Action issued in corresponding application No. 201810218789.6, dated Oct. 25, 2019.
(Continued)

*Primary Examiner* — Michael R. Fin
(74) *Attorney, Agent, or Firm* — Maschoff Brennan (57) ABSTRACT

A wireless charging receiving device, wireless charging method and system, and terminal device are provided. The device includes a control unit, receiving coil, rectifier-filter unit, first voltage conversion unit and battery cell module. The control unit transmits a first control signal to a wireless charging transmitting device and outputs a second control signal to the first voltage conversion unit if the wireless charging transmitting device is of a model belonging to a first preset model set and an output voltage of the battery cell module is within a preset range. The receiving coil senses a first electromagnetic wave to generate a first AC. The rectifier-filter unit converts the first AC into a first DC. The first voltage conversion unit converts the first DC into a second DC under the control of the second control signal. The battery cell module is charged by the second DC.

16 Claims, 7 Drawing Sheets

(51) Int. Cl.
*H02J 50/10* (2016.01)
*H02J 50/00* (2016.01)
(58) Field of Classification Search
USPC .......................................... 307/104
See application file for complete search history.

(56) References Cited

FOREIGN PATENT DOCUMENTS

| | | |
|---|---|---|
| CN | 203933127 U | 11/2014 |
| CN | 104242365 A | 12/2014 |
| CN | 106130092 A | 11/2016 |
| CN | 106253400 A | 12/2016 |
| CN | 106787055 A | 5/2017 |
| CN | 206452163 U | 8/2017 |
| CN | 206878499 U | 1/2018 |
| CN | 107769306 A | 3/2018 |
| CN | 108539832 A | 9/2018 |

OTHER PUBLICATIONS

International Search Report and Written Opinion issued in corresponding application No. PCT/CN2019/076885, dated Jun. 5, 2019.

* cited by examiner

WIRELESS CHARGING RECEIVING DEVICE, WIRELESS CHARGING METHOD AND SYSTEM, AND TERMINAL DEVICE

CROSS-REFERENCE TO RELATED APPLICATION

The present disclosure is a U.S. national phase application of a PCT Application No. PCT/CN2019/076885 filed on Mar. 4, 2019, which claims a priority to Chinese Patent Application No. 201810218789.6, filed with China National Intellectual Property Administration on Mar. 16, 2018, and entitled "WIRELESS CHARGING RECEIVING DEVICE, WIRELESS CHARGING METHOD AND SYSTEM, AND TERMINAL DEVICE", a disclosure of which is incorporated in its entirety by reference herein.

TECHNICAL FIELD

The present disclosure relates to the field of network technologies, in particular to a wireless charging receiving device, a wireless charging method and system, and a terminal device.

BACKGROUND

Wireless charging refers to a charging mode in which a charger feeds electric energy into a power-consuming device in a non-contact manner. The wireless charging technology has various advantages, such as concealed conductive contacts of a charger and a power-consuming device, simplified user operations during charging, reduced wear due to abrasion between a charger and a power-consuming device. Therefore, the wireless charging technology has extensive application prospects.

Generally, a wireless charging process includes: a wireless charging transmitting device converts electric energy of a mains supply into a high-frequency alternating current (AC), then converts the AC into an electromagnetic wave by using a transmitting coil, and transmits the electric energy to a wireless charging receiving end in a manner such as electromagnetic induction, magnetic resonance, radio waves, and electrical field coupling; and the wireless charging receiving end converts the electric energy transmitted by the wireless charging transmitting device into a high-frequency AC by using a receiving coil, and then converts the AC into a direct current (DC) to charge a battery cell. Both the transmitting coil and the receiving coil have certain impedances. Therefore, electric energy losses in the transmitting coil and the receiving coil are directly proportional to currents in the transmitting coil and the receiving coil. In conventional wireless charging solutions, a rated charging voltage of a battery cell is generally relatively low, and is usually approximately 4.35 V. To satisfy a charging power requirement of wireless charging, it is necessary to set relatively large currents for the transmitting coil and the receiving coil. As a result, in the conventional wireless charging solutions, energy losses in the transmitting coil and the receiving coil are usually high, which may account for more than fifty percent of a total energy loss in a wireless charging process.

SUMMARY

The present disclosure provides in some embodiments a wireless charging receiving device, a wireless charging method and system, and a terminal device, to resolve the problem of low wireless charging efficiency in conventional wireless charging solutions.

To resolve the foregoing technical problem, the present disclosure is implemented in the following manner.

In a first aspect, the present disclosure provides in some embodiments a wireless charging receiving device, including a control unit, a receiving coil, a rectifier-filter unit, a first voltage conversion unit, and a battery cell module, where the control unit is connected to the first voltage conversion unit and is configured to transmit a first control signal to a wireless charging transmitting device and output a second control signal to the first voltage conversion unit in a case that the wireless charging transmitting device is of a model belonging to a first preset model set and an output voltage of the battery cell module is within a preset range, wherein the first control signal is used for instructing the wireless charging transmitting device to transmit a first electromagnetic wave;

the receiving coil is connected to the rectifier-filter unit and is configured to sense the first electromagnetic wave to generate a first AC and feed the first AC into the rectifier-filter unit;

the rectifier-filter unit is configured to convert the first AC into a first DC and feed the first DC into the first voltage conversion unit;

the first voltage conversion unit is configured to convert the first DC into a second DC under the control of the second control signal and feed the second DC into the battery cell module, wherein a voltage at an end of the first voltage conversion unit connected to the battery cell module is greater than a voltage at an end of the first voltage conversion unit connected to the rectifier-filter unit and is equal to the output voltage of the battery cell module; and the battery cell module is connected to a ground terminal and is charged by the second DC.

In a second aspect, the present disclosure provides in some embodiments a wireless charging method, including:

transmitting a first control signal to a wireless charging transmitting device and generating a second control signal in a case that the wireless charging transmitting device is of a model belonging to a first preset model set and an output voltage of a battery cell module is within a preset range, wherein the first control signal is used for instructing the wireless charging transmitting device to transmit a first electromagnetic wave;

sensing the first electromagnetic wave to generate a first AC;

converting the first AC into a first DC and feeding the first DC into a first voltage conversion unit;

converting the first DC into a second DC by using the first voltage conversion unit under the control of the second control signal and feeding the second DC into the battery cell module, wherein a voltage at an end of the first voltage conversion unit connected to the battery cell module is greater than a voltage at an end of the first voltage conversion unit connected to a rectifier-filter unit and is equal to the output voltage of the battery cell module; and charging the battery cell module by the second DC.

In a third aspect, the present disclosure provides in some embodiments a wireless charging system, including a wireless charging transmitting device and the wireless charging receiving device according to the first aspect.

In a fourth aspect, the present disclosure provides in some embodiments a terminal device, including the wireless charging receiving device according to the first aspect.

DETAILED DESCRIPTION

The technical solutions in the embodiments of the present disclosure are described clearly hereinafter with reference to the accompanying drawings in the embodiments of the present disclosure. Apparently, the described embodiments are only some embodiments of the present disclosure rather than all the embodiments. All other embodiments obtained by a person of ordinary skill in the art based on the embodiments of the present disclosure without creative efforts fall within the scope of the present disclosure.

The terms "first", "second", and the like in the specification and claims of the present disclosure are only used to distinguish between different objects, and are not used to describe a specific order of objects. For example, a first transistor, a second transistor, and the like are used to distinguish between different transistors, rather than used to describe a specific order of transistors.

The term "and/or" in this specification is only an association relationship for describing associated objects and represents that three relationships may exist. For example, A and/or B may represent the following three cases: Only A exists, both A and B exist, and only B exists.

In the embodiments of the present disclosure, the terms such as "exemplary" or "for example" are used to represent examples, illustrations or descriptions. Any embodiment or design solution described as "exemplary" or preceded by "for example" in the embodiments of the present disclosure should not be construed to be more preferred than or superior over other embodiments or design solutions. Rather, the terms such as "exemplary" or "for example" are used to present related concepts in specific manners. Further, in the description of the embodiments of the present disclosure, "a plurality of" means "two or more" unless otherwise described.

As used in all the embodiments of the present disclosure, a transistor may be a thin film transistor, a field-effect transistor or another device having the same characteristics. According to the function in the technical solutions in the embodiments of the present disclosure, the transistor used in the embodiments of the present disclosure is a switching transistor. Because the source and drain electrodes of the switching transistor used herein are symmetrical, the source and drain electrodes can swap positions. In some embodiments of the present disclosure, to distinguish between the two electrodes other than the gate electrode of the transistor, the source electrode is referred to as a first electrode, and the drain electrode is referred to as a second electrode. According to the form in the accompanying drawings, it is specified that an intermediate terminal of the transistor is the gate electrode, a signal input terminal of the transistor is the source electrode, and a signal output terminal of the transistor is the drain electrode. In addition, the switching transistor used in the embodiments of the present disclosure includes a P-type switching transistor and an N-type switching transistor. The P-type switching transistor is turned on when the gate electrode is at a low electrical level and is turned off when the gate electrode is at a high electrical level. The N-type switching transistor is turned on when the gate electrode is at a high electrical level and is turned off when the gate electrode is at a low electrical level.

Both a transmitting coil and a receiving coil have impedances. Therefore, electric energy losses in the transmitting coil and the receiving coil are directly proportional to currents in the transmitting coil and the receiving coil. In wireless charging solutions in the related art, a rated charging voltage of a battery cell is generally relatively low. To satisfy a charging power requirement of wireless charging, it is necessary to set relatively large currents for the transmitting coil and the receiving coil. As a result, in conventional wireless charging solutions, energy losses in the transmitting coil and the receiving coil are usually relatively high.

To resolve the problem, the present disclosure provides in some embodiments a wireless charging receiving device, a wireless charging method and system, and a terminal device. The wireless charging receiving device includes a control unit, a receiving coil, a rectifier-filter unit, a first voltage conversion unit, and a battery cell module. The control unit may transmit a first control signal to a wireless charging transmitting device and output a second control signal to the first voltage conversion unit in the case that the wireless charging transmitting device is of a model belonging to a first preset model set and an output voltage of a battery cell module is within a preset range. The receiving coil may sense a first electromagnetic wave to generate a first AC. The rectifier-filter unit may convert the first AC into a first DC. The first voltage conversion unit may convert the first DC into a second DC under the control of the second control signal. The battery cell module may be charged by the second DC. Since a voltage at an end of the first voltage conversion unit connected to the battery cell module is equal to the output voltage of the battery cell module in the embodiments of the present disclosure, firstly, it can be ensured that the wireless charging receiving device normally charges the battery cell module. Further, since the voltage at the end of the first voltage conversion unit connected to the battery cell module is greater than a voltage at an end of the first voltage conversion unit connected to the rectifier-filter unit, currents in the transmitting coil and the receiving coil can be reduced while a wireless charging power requirement is satisfied, so that energy losses in the transmitting coil and the receiving coil are reduced, thereby improving the efficiency of wireless charging. That is, in the embodiments of the present disclosure, it can be ensured that, while the wireless charging receiving device operates normally, energy losses in the transmitting coil and the receiving coil are reduced, thereby improving the efficiency of wireless charging.

Figure 1:
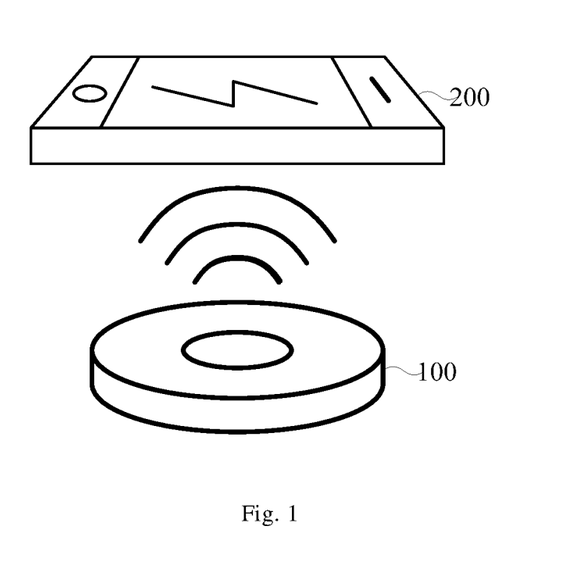
FIG. 1 is a schematic diagram of a wireless charging system according to some embodiments of the present disclosure.

As shown in FIG. 1, in an application scenario of the embodiments of the present disclosure, a wireless charging system provided in some embodiments of the present disclosure may include a wireless charging transmitting device 100 and a wireless charging receiving device 200.

The wireless charging transmitting device 100 is configured to convert electric energy of a mains supply into a high-frequency AC and convert the AC into an electromagnetic wave by using a transmitting coil. The wireless charging receiving device 200 is configured to generate electric energy from the electromagnetic wave transmitted by the wireless charging transmitting device 100, to charge a battery cell.

In addition, a wireless communication link may be established between the wireless charging transmitting device 100 and the wireless charging receiving device 200 based on a standard wireless charging communication protocol or a customized wireless charging communication protocol, and information may be transmitted to each other by using the established wireless communication link. The standard wireless charging communication protocol may specifically include: the Qi standard, the Power Matters Alliance (PMA) standard, the Alliance for Wireless Power (A4WP) standard, the Invisible Power Field (iNPOFi) technology, the magnetic resonance wireless charging (Wi-Po) or the like.

The wireless charging receiving device 200 provided in some embodiments of the present disclosure may be a terminal device such as a mobile phone, a tablet computer, a notebook computer, an ultra-mobile personal computer (UMPC), a net book, a personal digital assistant (PDA), a smartwatch or a smart wristband. Optionally, the wireless charging receiving device 200 may be another type of terminal device. This is not limited in the embodiments of the present disclosure. According to some embodiments of the present disclosure, for example, the wireless charging receiving device 200 is illustrated in FIG. 1 as a mobile phone.

First Embodiment

The present disclosure provides in an embodiment a wireless charging receiving device. Specifically, referring to FIG. 2, the wireless charging receiving device 200 includes a control unit 11, a receiving coil 12, a rectifier-filter unit 13, a first voltage conversion unit 14, and a battery cell module 15.

Figure 2:
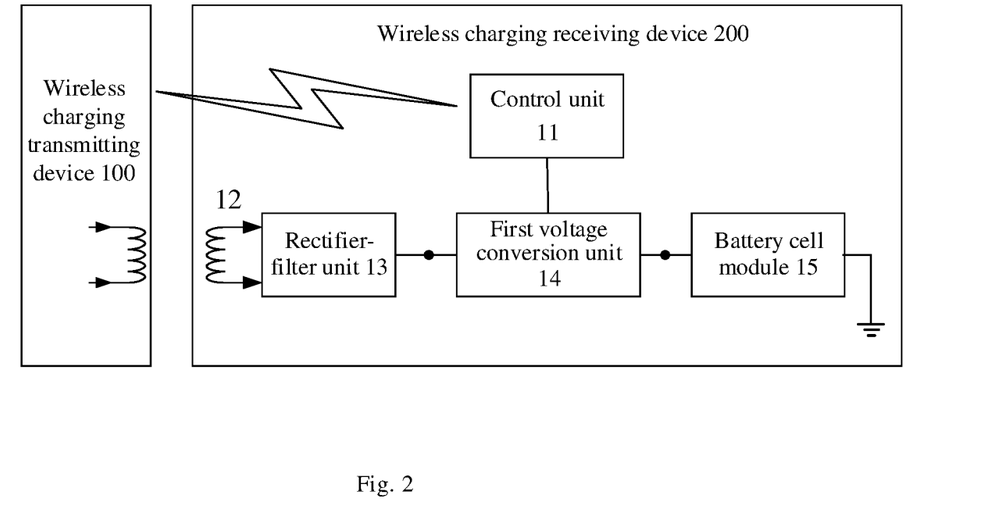
FIG. 2 is a first schematic structural diagram of a wireless charging receiving device according to some embodiments of the present disclosure.

The control unit 11 is connected to the first voltage conversion unit 14, and is configured to transmit a first control signal to the wireless charging transmitting device 100 and output a second control signal to the first voltage conversion unit 14 in the case that the wireless charging transmitting device 100 is of a model belonging to a first preset model set and an output voltage of the battery cell module 15 is within a preset range.

The first control signal is used for instructing the wireless charging transmitting device 100 to transmit a first electromagnetic wave.

Optionally, a process by which the control unit 11 implements the foregoing function may include: when the wireless charging receiving device 200 is placed in a wireless charging area, the wireless charging receiving device 200 first establishes a wireless communication link with the wireless charging transmitting device 100 by using a standard wireless charging communication protocol or a customized wireless charging communication protocol, acquires the model of the wireless charging transmitting device 100 by using the established wireless communication link, and determines whether the model of the wireless charging transmitting device 100 belongs to the first preset model set; if the model of the wireless charging transmitting device 100 belongs to the first preset model set, the wireless charging receiving device 200 further acquires a current output voltage of the battery cell module 15, and determines whether the output voltage of the battery cell module 15 is within the preset range; and if the output voltage of the battery cell module 15 is within the preset range, the wireless charging receiving device 200 transmits the first control signal to the wireless charging transmitting device 100 by using the wireless communication link established with the wireless charging transmitting device 100 and outputs the second control signal to the first voltage conversion unit 14.

Optionally, in the process of implementing the foregoing function, the control unit 11 may first acquire the current output voltage of the battery cell module 15, determine whether the output voltage of the battery cell module 15 is within the preset range, if the output voltage of the battery cell module 15 is within the preset range, further establish a wireless communication link with the wireless charging transmitting device 100, acquire the model of the wireless charging transmitting device 100 by using the established wireless communication link, and determine whether the model of the wireless charging transmitting device 100 belongs to the first preset model set; and if the model of the wireless charging transmitting device 100 belongs to the first preset model set, transmit the first control signal to the wireless charging transmitting device 100 by using the wireless communication link established with the wireless charging transmitting device 100 and output the second control signal to the first voltage conversion unit 14.

Further, the first preset model set in the foregoing embodiments may only include the model of the original wireless charging transmitting device matching the wireless charging receiving device, or may include the model of the original wireless charging transmitting device matching the wireless charging receiving device and the model of another wireless charging transmitting device that is capable of adjusting the power of the transmitted electromagnetic wave according to the first control signal.

Further, the preset range in the foregoing implementations may be set according to a rated voltage of the battery cell module 15 and a power-on threshold voltage of a power-consuming device to which the wireless charging receiving device 200 belongs. For example, assuming the rated voltage of the battery cell module 15 is 8.8 V, if the voltage of the battery cell module 15 is greater than 6.4 V, the power-consuming device to which the wireless charging receiving device 200 belongs may be normally powered on; if the voltage of the battery cell module 15 is less than or equal to 6.4 V, the power-consuming device to which the wireless charging receiving device 200 belongs may be in a power-off state. In this case, the preset range may be set to (6.4 V, 8.8 V).

Further, the first control signal in the foregoing embodiments may include: a charging voltage and a charging current required by the wireless charging receiving device 200. After receiving the first control signal, the wireless charging transmitting device 100 configures and generates a voltage and a current for the first electromagnetic wave according to the charging voltage required by the wireless charging receiving device 200 and the charging current required by the wireless charging receiving device 200, so as to generate the first electromagnetic wave capable of providing the charging voltage and the charging current required by the wireless charging receiving device 200.

The receiving coil 12 is connected to the rectifier-filter unit 13 and is configured to sense the first electromagnetic wave to generate a first AC and feed the first AC into the rectifier-filter unit 13.

For example, the receiving coil 12 may sense the first electromagnetic wave by using specifically electromagnetic induction, magnetic resonance, radio waves, electrical field coupling, or the like to generate the first AC.

The rectifier-filter unit 13 is configured to generate a first DC from the first AC and feed the first DC into the first voltage conversion unit 14.

That is, the rectifier-filter unit 13 is a rectifier-filter circuit capable of converting AC power into DC power. For example, the rectifier-filter unit 13 in the embodiments of the present disclosure may be specifically a half-wave rectifier circuit, a full-wave rectifier circuit, a bridge rectifier circuit or the like.

The first voltage conversion unit 14 is configured to convert the first DC into a second DC under the control of the second control signal and feed the second DC into the battery cell module.

A voltage at an end of the first voltage conversion unit connected to the battery cell module is greater than a voltage at an end of the first voltage conversion unit connected to the rectifier-filter unit, and is equal to the output voltage of the battery cell module.

That is, a voltage generated after the first electromagnetic wave transmitted by the wireless charging transmitting device 100 is received by the receiving coil 12 and processed by the rectifier-filter unit 13 is greater than the output voltage of the battery cell module. Since the voltage generated from the first electromagnetic wave is greater than the output voltage of the battery cell module, in the embodiments of the present disclosure, currents in the transmitting coil and the receiving coil can be reduced while a wireless charging power requirement is satisfied, so that energy losses in the transmitting coil and the receiving coil are reduced, thereby improving the efficiency of wireless charging.

Optionally, the voltage at the end of the first voltage conversion unit 14 connected to the battery cell module 15 is twice the voltage at the end of the first voltage conversion unit 14 connected to the rectifier-filter unit 13.

If the voltage at the end of the first voltage conversion unit 14 connected to the battery cell module 15 is twice the voltage at the end of the first voltage conversion unit 14 connected to the rectifier-filter unit 13, the voltage generated from the first electromagnetic wave is twice the output voltage of the battery cell module. Therefore, while a wireless charging power requirement is satisfied, the current in the receiving coil can be reduced to half of the original current.

Figure 3:
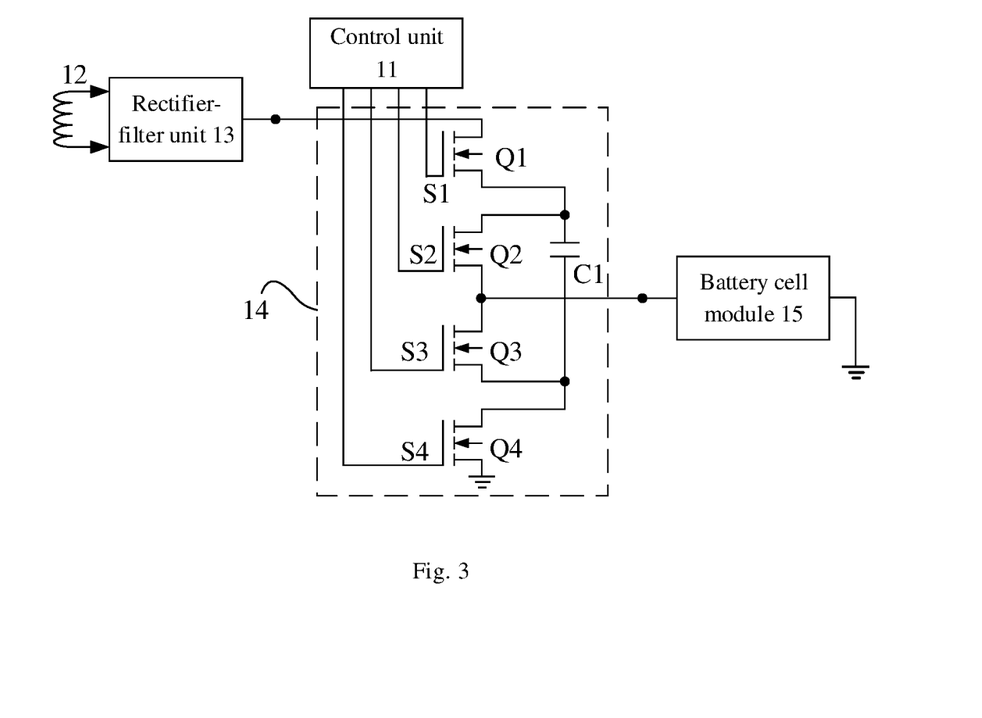
FIG. 3 is a second schematic structural diagram of a wireless charging receiving device according to some embodiments of the present disclosure.

Optionally, referring to FIG. 3, the second control signal includes a first scan signal S1, a second scan signal S2, a third scan signal S3, and a fourth scan signal S4;

the first voltage conversion unit 14 includes a first transistor Q1, a second transistor Q2, a third transistor Q3, a fourth transistor Q4, and a first capacitor C1;

a first electrode of the first transistor Q1 is connected to the rectifier-filter unit 13, a second electrode of the first transistor Q1 is connected to a first electrode of the first capacitor C1 and a first electrode of the second transistor Q2, and a gate driving signal of the first transistor Q1 is the first scan signal S1;

a second electrode of the second transistor Q2 is connected to the battery cell module 15 and a first electrode of the third transistor Q3, and a gate driving signal of the second transistor Q2 is the second scan signal S2;

a second electrode of the third transistor Q3 is connected to a second electrode of the first capacitor C1 and a first electrode of the fourth transistor Q4, and a gate driving signal of the third transistor Q3 is the third scan signal S3; and a second electrode of the fourth transistor Q4 is grounded, and a gate driving signal of the fourth transistor Q4 is the fourth scan signal S4.

Figure 4:
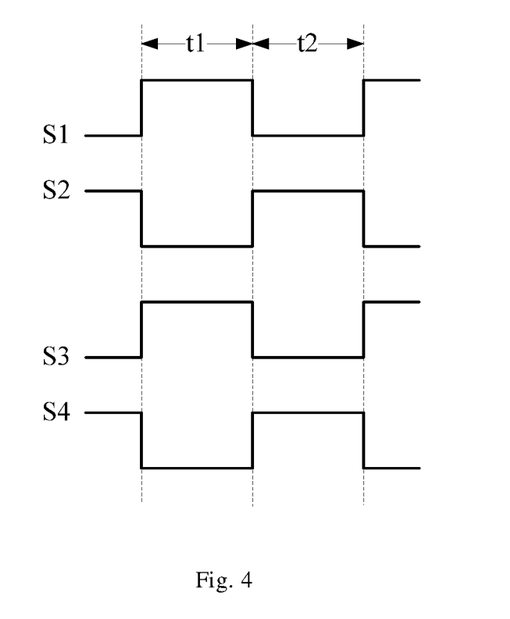
FIG. 4 is a timing state diagram of scan signals for controlling the wireless charging receiving device as shown in FIG. 3 according to some embodiments of the present disclosure.

The operating principle of the first voltage conversion unit 14 provided in FIG. 3 is described below with reference to the signal timing diagram as shown in FIG. 4. For the purpose of description, the case in which all the transistors in the first voltage conversion unit 14 are N-type transistors that are on when the gate electrode is at a high electrical level as shown in FIG. 3 is taken as an example. FIG. 4 shows timing states of the first scan signal S1, the second scan signal S2, the third scan signal S3, and the fourth scan signal S4. As shown in FIG. 4, timing states in two phases, namely, a first phase t1 and a second phase t2, are provided.

In the first phase t1, the first scan signal S1 and the third scan signal S3 are at a high electrical level, and the second scan signal S2 and the fourth scan signal S4 are at a low electrical level. Therefore, the first transistor Q1 is turned on, the second transistor Q2 is turned off, the third transistor Q3 is turned on, and the fourth transistor Q4 is turned off. Because the first transistor Q1 is turned on, the first electrode of the first capacitor C1 is connected to the rectifier-filter unit 13 by the first transistor Q1. Because the third transistor Q3 is turned on, the second electrode of the first capacitor C1 is connected to the battery cell module by the third transistor Q3. Therefore, a voltage at the second electrode of the first capacitor C1 is the output voltage of the battery cell module.

If the voltage outputted by the rectifier-filter unit 13 is twice the output voltage of the battery cell module, a voltage at the first electrode of the first capacitor C1 is twice the output voltage of the battery cell module. In this case, if the output voltage of the battery cell module is denoted as $V_{bat}$, the voltage at the first electrode of the first capacitor C1 is denoted as $V_{c1+}$, the voltage at the second electrode of the first capacitor C1 is denoted as $V_{c1-}$, and a voltage difference between two electrodes of the first capacitor C1 is denoted as $U_{C1}$, then after the first phase t1:

$V_{c1+} = 2V_{bat}$;

$V_{c1-} = V_{bat}$;

$U_{C1} = V_{C1+} - V_{C1-} = 2V_{bat} - V_{bat} = V_{bat}$.

In the second phase t2, the first scan signal S1 and the third scan signal S3 are at a low electrical level, and the second scan signal S2 and the fourth scan signal S4 are at a high electrical level. Therefore, the first transistor Q1 is turned off, the second transistor Q2 is turned on, the third transistor Q3 is turned off, and the fourth transistor Q4 is turned on. Because the fourth transistor Q4 is turned on, the second electrode of the first capacitor C1 is grounded by the fourth transistor Q4. The voltage at the second electrode of the first capacitor C1 decreases to 0. Further, because a capacitor has the characteristic of keeping the voltage difference between two electrodes stable, the first electrode of the first capacitor C1 discharges electricity, and the discharging voltage is equal to the decreased voltage at the second electrode of the first capacitor C1. In addition, because the second transistor Q2 is turned on, the electricity discharging from the first electrode of the first capacitor C1 follows the path: from the first electrode of the first capacitor C1 to the battery cell module 15 via the second transistor Q2. Therefore, in the second phase t2, the voltage outputted by the first voltage conversion unit 14 to the battery cell module 15 is equal to the decreased voltage at the second electrode of the first capacitor C1. That is, in the second phase t2, the voltage outputted by the first voltage conversion unit 14 to the battery cell module 15 is equal to the output voltage of the battery cell module 15.

With the first phase t1 and the second phase t2 constituting one complete operating period of the first voltage conversion unit 14, the first voltage conversion unit 14 cycles through the first phase t1 and the second phase t2 repeatedly, to continuously output to the battery cell module 15 the output voltage of the battery cell module 15.

Further, all the transistors in the first voltage conversion unit 14 in the foregoing embodiments may alternatively be P-type transistors that are on at a low electrical level. If all the transistors are P-type transistors, it is only necessary to re-adjust the timing states of the scan signals (S1, S2, S3, S4). For example, in the first phase t1, the first scan signal S1 and the third scan signal S3 are controlled to be at a low electrical level, and the second scan signal S2 and the fourth scan signal S4 are controlled to be at a high electrical level.

Further, both N-type transistors and P-type transistors may be used together in the first voltage conversion unit 14. Certainly, these are reasonable variants that may be made by a person skilled in the art based on the embodiments of the present disclosure, and therefore should all fall within the scope of the present disclosure. However, in consideration of a manufacturing process of transistors, because active layers of different types of transistors require different dopant materials, using the same type of transistors in the first voltage conversion unit 14 is more beneficial to the simplification of the manufacturing process of the first voltage conversion unit 14.

In addition, in the foregoing embodiments, the timing states of the first scan signal S1 and the third scan signal S3 are always identical to each other, and the timing states of the second scan signal S2 and the fourth scan signal S4 are always identical to each other. Therefore, the first scan signal S1 and the third scan signal S3 may share a scan signal line, and the second scan signal S2 and the fourth scan signal S4 may share a scan signal line, to reduce the quantity of signal lines in the first voltage conversion unit 14, thereby reducing the integrated circuit cost.

It further needs to be noted that, in the foregoing embodiments, the timing states of the first scan signal S1 and the third scan signal S3 are always opposite to the timing states of the second scan signal S2 and the fourth scan signal S4. Therefore, an inverter and a single scan signal may be used to output the first scan signal S1, the second scan signal S2, the third scan signal S3, and the fourth scan signal S4, to reduce the driver circuits for generating the scan signals, thereby further reducing the integrated circuit cost.

The battery cell module 15 is connected to a ground terminal and is charged by the second DC.

Figure 5:
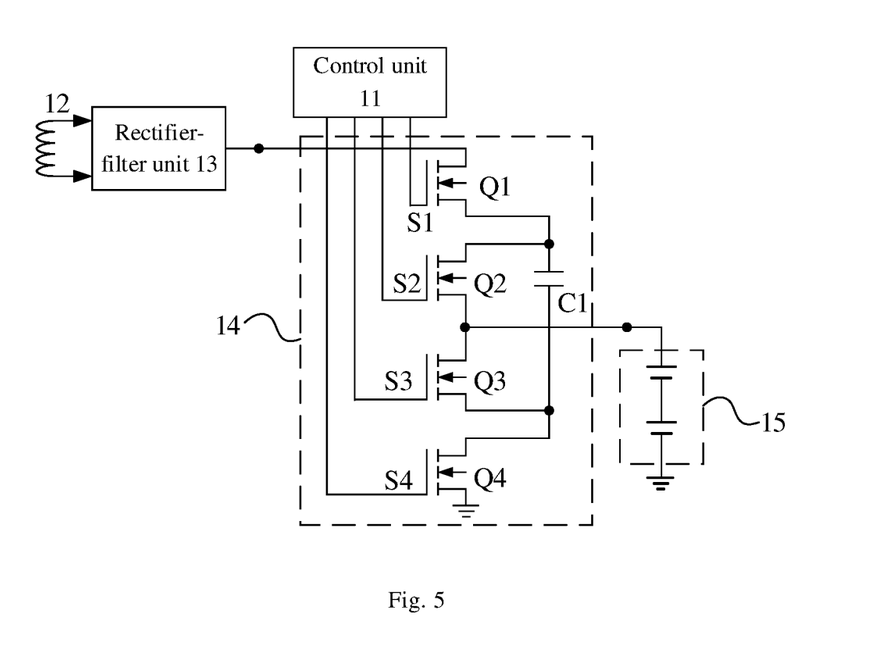
FIG. 5 is a third schematic structural diagram of a wireless charging receiving device according to some embodiments of the present disclosure.

Optionally, referring to FIG. 5, the battery cell module 15 includes n battery cells connected in series, wherein n is an integer greater than or equal to 2. A case in which n is equal to 2 is shown in FIG. 5.

The battery cell module 15 in the foregoing embodiments includes n battery cells connected in series between the first voltage conversion unit and the ground terminal. Therefore, the output voltage of the battery cell module is equal to the sum of voltages on the n battery cells. Compared with a single battery cell, in this example, the output voltage of the battery cell module may be increased, so as to further increase the voltages on the transmitting coil and the receiving coil and reduce currents in the transmitting coil and the receiving coil, to further reduce energy losses in the transmitting coil and the receiving coil, thereby improving the efficiency of wireless charging.

The wireless charging receiving device provided in some embodiments of the present disclosure includes a control unit, a receiving coil, a rectifier-filter unit, a first voltage conversion unit, and a battery cell module. The control unit may transmit a first control signal to a wireless charging transmitting device and output a second control signal to the first voltage conversion unit in the case that the wireless charging transmitting device is of a model belonging to a first preset model set and an output voltage of the battery cell module is within a preset range. The receiving coil may sense a first electromagnetic wave to generate a first AC. The rectifier-filter unit may convert the first AC into a first DC. The first voltage conversion unit may convert the first DC into a second DC under the control of the second control signal. The battery cell module may be charged by the second DC. Since a voltage at an end of the first voltage conversion unit connected to the battery cell module is equal to the output voltage of the battery cell module in the embodiments of the present disclosure, firstly, it can be ensured that the wireless charging receiving device normally charges the battery cell module. Further, since the voltage at the end of the first voltage conversion unit connected to the battery cell module is greater than a voltage at an end of the first voltage conversion unit connected to the rectifier-filter unit, currents in a transmitting coil and the receiving coil can be reduced while a wireless charging power requirement is satisfied, so that energy losses in the transmitting coil and the receiving coil are reduced, thereby improving the efficiency of wireless charging. That is, in the embodiments of the present disclosure, it can be ensured that, while the wireless charging receiving device operates normally, energy losses in the transmitting coil and the receiving coil are reduced, thereby improving the efficiency of wireless charging.

In addition, it further needs to be noted that the wireless charging receiving device provided in the foregoing embodiments may reduce energy losses in the transmitting coil and the receiving coil, thereby improving the efficiency of wireless charging. Therefore, thermal energy converted from electric energy lost in a wireless charging process can be reduced. Therefore, the wireless charging receiving device provided in the foregoing embodiments may further achieve a higher power wireless charging with thermal power consumption being the same, so as to enable a fast wireless charging function.

When the battery cell module 15 in the foregoing embodiments is formed by a plurality of battery cells connected in series, the charging voltage of the wireless charging receiving device 200 is greater than a transmitting voltage of a standard wireless charging transmitting device. Therefore, the foregoing wireless charging receiving device 200 cannot be charged by using a standard wireless charging transmitting device. That is, the wireless charging receiving device 200 has relatively poor compatibility. To further resolve the problem that the wireless charging receiving device 200 has relatively poor compatibility, referring to FIG. 6, the wireless charging receiving device 200 further includes a second voltage conversion unit 16.

Figure 6:
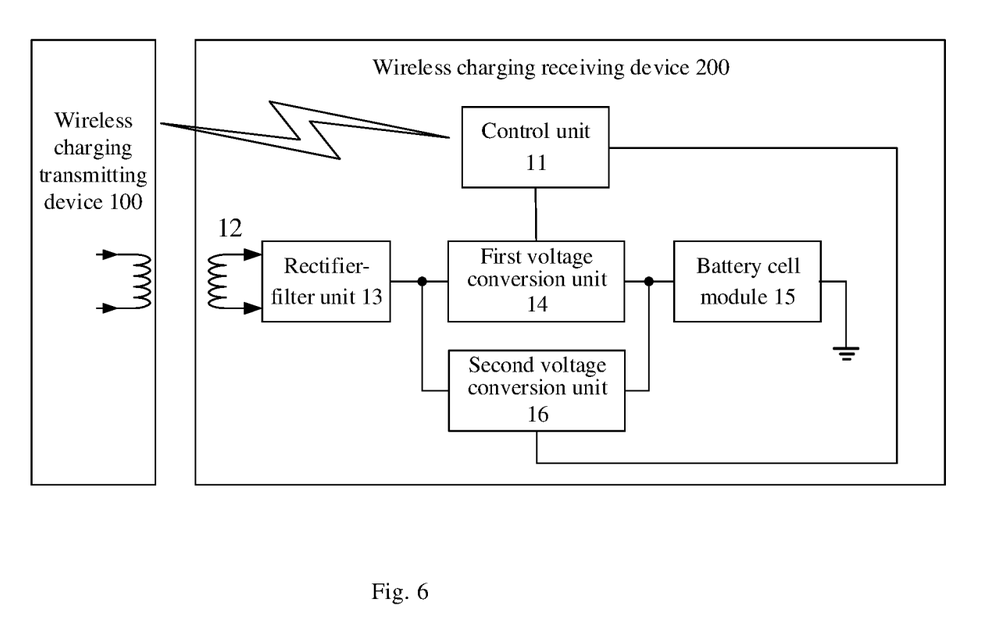
FIG. 6 is a fourth schematic structural diagram of a wireless charging receiving device according to some embodiments of the present disclosure.

The control unit 11 is further configured to output a third control signal to the second voltage conversion unit 16 in the case that the wireless charging transmitting device 100 is of a model belonging to a second preset model set.

Specifically, the second preset model set in the foregoing embodiment may include the model of a wireless charging transmitting device that supports a standard wireless charging protocol.

The receiving coil 12 is further configured to sense a second electromagnetic wave transmitted by the wireless charging transmitting device 100 to generate a second AC and feed the second AC into the rectifier-filter unit 13.

The rectifier-filter unit 13 is further configured to convert the second AC into a third DC and feed the third DC into the second voltage conversion unit 16.

The second voltage conversion unit 16 is configured to convert the third DC into a fourth DC under the control of the third control signal and output the fourth DC to the battery cell module 15. A voltage at an end of the second voltage conversion unit 16 connected to the battery cell module 15 is greater than a voltage at an end of the second voltage conversion unit 16 connected to the rectifier-filter unit 13, and is equal to rated charging voltage of the battery cell module 15.

The battery cell module 15 is further charged by the fourth DC.

The second voltage conversion unit 16 in the foregoing embodiment may convert the third DC whose voltage is less than the rated charging voltage of the battery cell module into the fourth DC whose voltage is equal to the rated charging voltage of the battery cell module, so as to charge the battery cell module 15 by the fourth DC. Therefore, in the foregoing embodiment, the problem that the wireless charging receiving device 200 cannot be charged by using the standard wireless charging transmitting device can be resolved.

Figure 7:
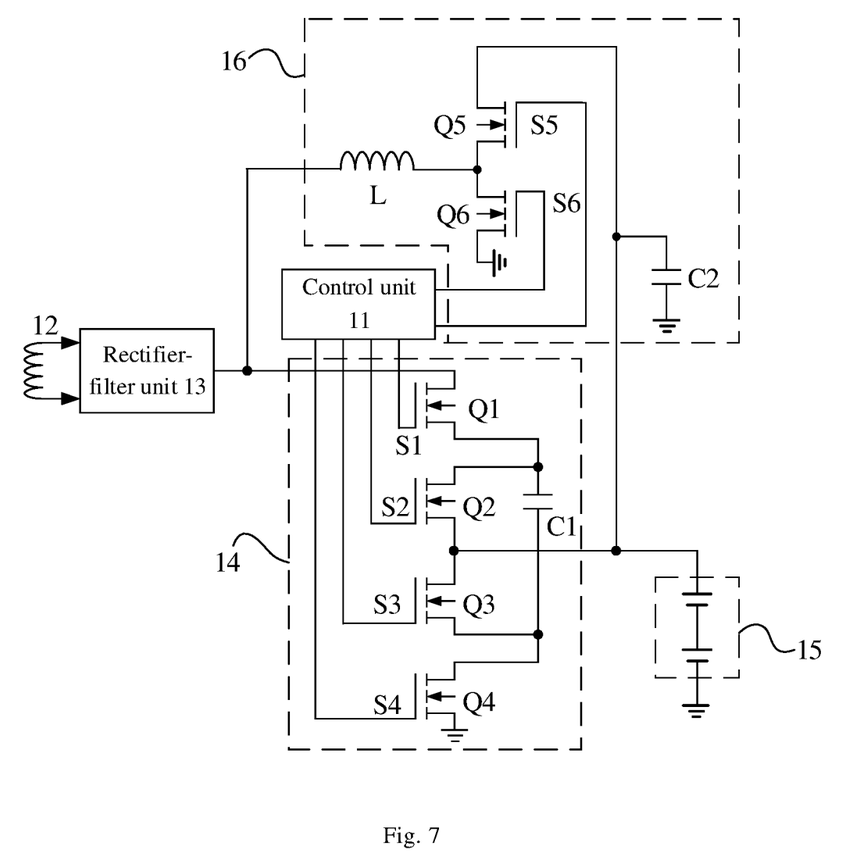
FIG. 7 is a fifth schematic structural diagram of a wireless charging receiving device according to some embodiments of the present disclosure.

Optionally, referring to FIG. 7, the third control signal includes a fifth scan signal S5 and a sixth scan signal S6;

the second voltage conversion unit 16 includes an inductor L, a fifth transistor Q5, a sixth transistor Q6, and a second capacitor C2;

a first terminal of the inductor L is connected to the rectifier-filter unit 13, and a second terminal of the inductor L is connected to a first electrode of the fifth transistor Q5 and a first electrode of the sixth transistor Q6;

a second electrode of the fifth transistor Q5 is connected to the battery cell module 15 and a first electrode of the second capacitor C2, and the fifth scan signal S5 is inputted at the gate electrode of the fifth transistor Q5;

a second electrode of the sixth transistor Q6 is grounded, and the sixth scan signal S6 is inputted at the gate electrode of the sixth transistor Q6; and a second electrode of the second capacitor C2 is grounded.

Figure 8:
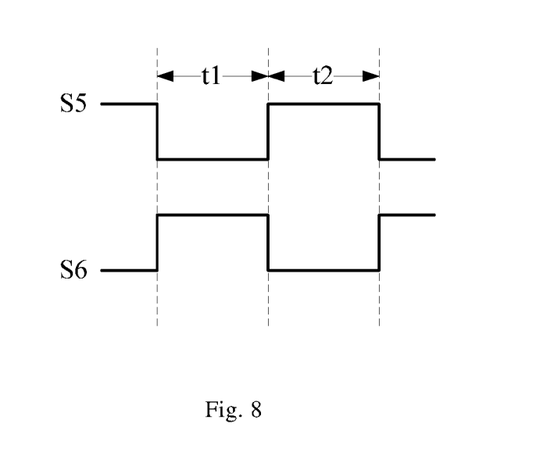
FIG. 8 is a timing state diagram of scan signals for controlling the wireless charging receiving device as shown in FIG. 7 according to some embodiments of the present disclosure.

The operating principle of the second voltage conversion unit 16 provided in FIG. 7 is described below with reference to the signal timing diagram as shown in FIG. 8. For the purpose of description, the case in which all the transistors in the second voltage conversion unit 16 are N-type transistors that are on when the gate electrode is at a high electrical level as shown in FIG. 7 is taken as an example. FIG. 8 shows timing states of the fifth scan signal S5 and the sixth scan signal S6. As shown in FIG. 8, timing states in two phases, namely, the first phase t1 and the second phase t2, are provided.

In the first phase t1, the fifth scan signal S5 is at a low electrical level, and the sixth scan signal S6 is at a high electrical level. Therefore, the fifth transistor Q5 is turned off, and the sixth transistor Q6 is turned on. The third DC outputted by the rectifier-filter unit 13 flows into a grounding terminal through the inductor L and the sixth transistor Q6. Meanwhile, because the inductor L has the characteristic of inhibiting a current change in the path, the inductor stores electric energy.

In the second phase t2, the fifth scan signal S5 is at a high electrical level, and the sixth scan signal S6 is at a low electrical level. Therefore, the fifth transistor Q5 is turned on, and the sixth transistor Q6 is turned off. Similarly, since the inductor L has a characteristic of inhibiting a current change in the path, the inductor starts to discharge electricity. Further, because the sixth transistor Q6 is turned off and the original current path is open, the inductor L charges the first electrode of the second capacitor C2 via the fifth transistor Q5. In this phase, the voltage at the first electrode of the second capacitor C2 is the sum of the charging voltage of the inductor L and the voltage outputted by the rectifier-filter unit 13. Therefore, the voltage at the first electrode of the second capacitor C2 is greater than the voltage outputted by the rectifier-filter unit 13. As a result, the second voltage conversion unit 16 may output a voltage greater than its input voltage. In practice, the inductance value of the inductor L and the capacitance value of the second capacitor C2 may be configured, so that the second voltage conversion unit 16 outputs the fourth DC whose voltage is the rated charging voltage of the battery cell module 15.

With the first phase t1 and the second phase t2 constituting one complete operating period of the second voltage conversion unit 16, the second voltage conversion unit 16 cycles through the first phase t1 and the second phase t2 repeatedly, to continuously output to the battery cell module 15 the rated voltage of the battery cell module 15.

Further, all the transistors in the second voltage conversion unit 16 in the foregoing embodiments may alternatively be P-type transistors that are on at a low electrical level. If all the transistors are P-type transistors, it is only necessary to re-adjust the timing states of the scan signals. For example, in the first phase t1, the fifth scan signal S5 is controlled to be at a high electrical level, and the sixth scan signal S6 is controlled to be at a low electrical level.

Further, both N-type transistors and P-type transistors may be used together in the second voltage conversion unit 16. Certainly, these are reasonable variants that may be made by a person skilled in the art based on the embodiments of the present disclosure, and therefore should all fall within the scope of the present disclosure. However, in consideration of a manufacturing process of transistors, because active layers of different types of transistors require different dopant materials, using the same type of transistors in the second voltage conversion unit 16 is more beneficial to the simplification of the manufacturing process of the second voltage conversion unit 16.

In addition, in the foregoing embodiments, the timing state of the fifth scan signal S5 is always opposite to the timing state of the sixth scan signal S6. Therefore, an inverter and a single scan signal may be used to output the fifth scan signal S5 and the sixth scan signal S6, to reduce the driver circuits for generating the scan signals, thereby further reducing the integrated circuit cost.

A charging process of the wireless charging receiving device provided in the foregoing embodiments may include: when a power-consuming device including the wireless charging receiving device 200 is placed in a charging area of the wireless charging transmitting device, first, the second voltage conversion unit 16 is powered on by default, to charge a battery cell module by boosting a third DC generated from a second electromagnetic wave transmitted by the wireless charging transmitting device; and then it is determined, according to the model of the wireless charging transmitting device and an output voltage of the battery cell module, whether to power on the first voltage conversion unit 14.

Second Embodiment

The present disclosure provides in an embodiment a wireless charging method. The wireless charging method may be performed by a wireless charging receiving device. Specifically, referring to FIG. 9, the method includes the following steps.

Figure 9:
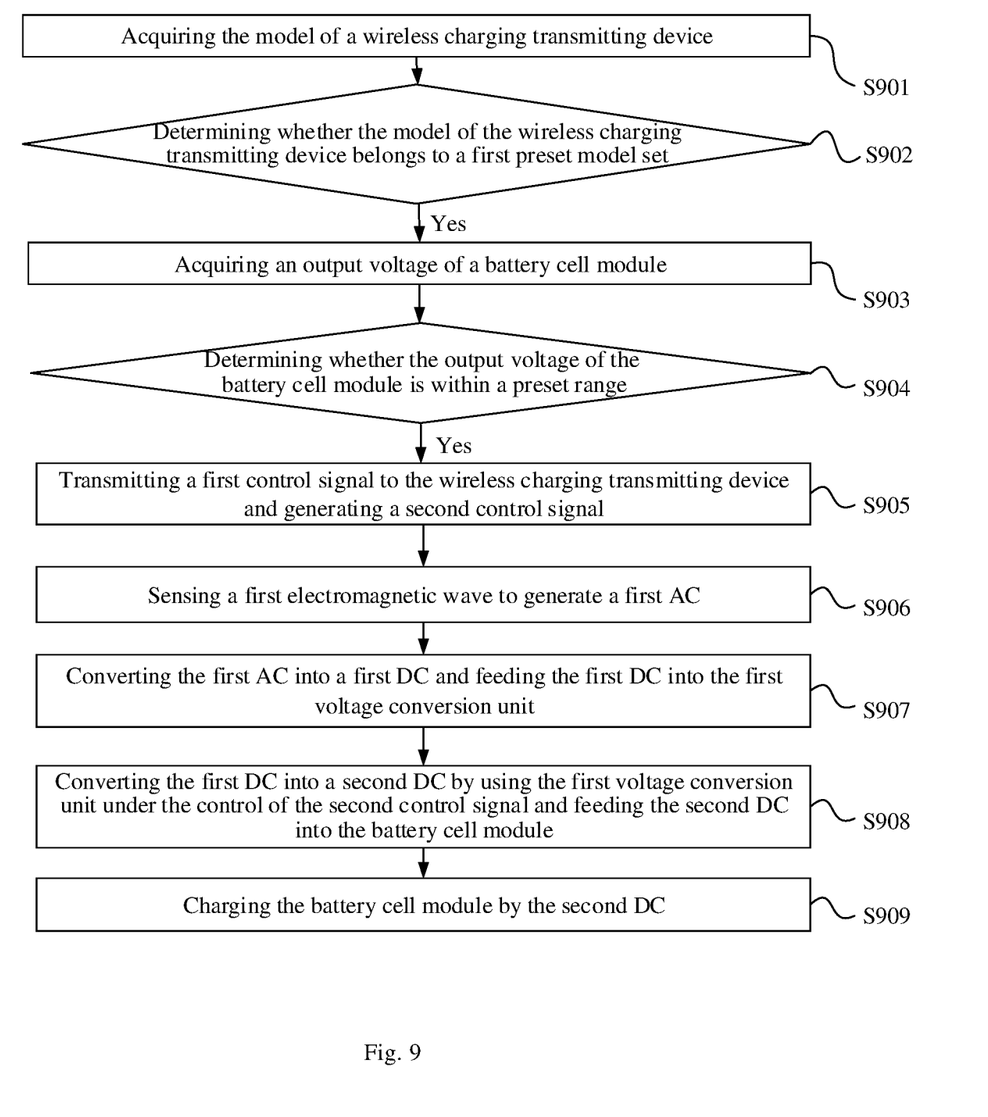
FIG. 9 is a first flowchart of a wireless charging method according to some embodiments of the present disclosure.

A step S901 includes: acquiring the model of a wireless charging transmitting device.

A step S902 includes: determining whether the wireless charging transmitting device is of a model belonging to a first preset model set.

In the step S902, if the wireless charging transmitting device is of a model belonging to the first preset model set, a step S903 is performed.

The step S903 includes: acquiring an output voltage of a battery cell module.

A step S904 includes: determining whether the output voltage of the battery cell module is within a preset range.

In the step S904, if the output voltage of the battery cell module is within the preset range, a step S905 is performed. That is, in the case that the wireless charging transmitting device is of a model belonging to the first preset model set and the output voltage of the battery cell module is within the preset range, the step S905 is performed.

The step S905 includes: transmitting a first control signal to the wireless charging transmitting device and generating a second control signal.

The first control signal is used for instructing the wireless charging transmitting device to transmit a first electromagnetic wave.

A step S906 includes: sensing the first electromagnetic wave to generate a first AC.

A step S907 includes: converting the first AC into a first DC and feeding the first DC into a first voltage conversion unit.

A voltage of the first DC is twice the output voltage of the battery cell module.

A step S908 includes: converting the first DC into a second DC by using the first voltage conversion unit under the control of the second control signal and feeding the second DC into the battery cell module.

A voltage at an end of the first voltage conversion unit connected to the battery cell module is greater than a voltage at an end of the first voltage conversion unit connected to a rectifier-filter unit and is equal to the output voltage of the battery cell module.

A step S909 includes: charging the battery cell module by the second DC.

Optionally, the second control signal includes a first scan signal, a second scan signal, a third scan signal, and a fourth scan signal;

the first voltage conversion unit includes a first transistor, a second transistor, a third transistor, a fourth transistor, and a first capacitor;

a first electrode of the first transistor is connected to the rectifier-filter unit, a second electrode of the first transistor is connected to a first electrode of the first capacitor and a first electrode of the second transistor, and a gate driving signal of the first transistor is the first scan signal;

a second electrode of the second transistor is connected to the battery cell module and a first electrode of the third transistor, and a gate driving signal of the second transistor is the second scan signal;

a second electrode of the third transistor is connected to a second electrode of the first capacitor and a first electrode of the fourth transistor, and a gate driving signal of the third transistor is the third scan signal;

a second electrode of the fourth transistor is grounded, and the fourth scan signal is inputted at the gate electrode of the fourth transistor.

the converting the first DC into the second DC by using the first voltage conversion unit under the control of the second control signal and feeding the second DC into the battery cell module includes:

in a first phase, controlling, with the first scan signal, the first transistor to be on, controlling, with the second scan signal, the second transistor to be off, controlling, with the third scan signal, the third transistor to be on, and controlling, with the fourth scan signal, the fourth transistor to be off; and in a second phase, controlling, with the first scan signal, the first transistor to be off, controlling, with the second scan signal, the second transistor to be on, controlling, with the third scan signal, the third transistor to be off, and controlling, with the fourth scan signal, the fourth transistor to be on.

Optionally, the charging the battery cell module by the second DC includes:

charging, by using the second DC, n battery cells connected in series, wherein n is an integer greater than or equal to 2.

Figure 10:
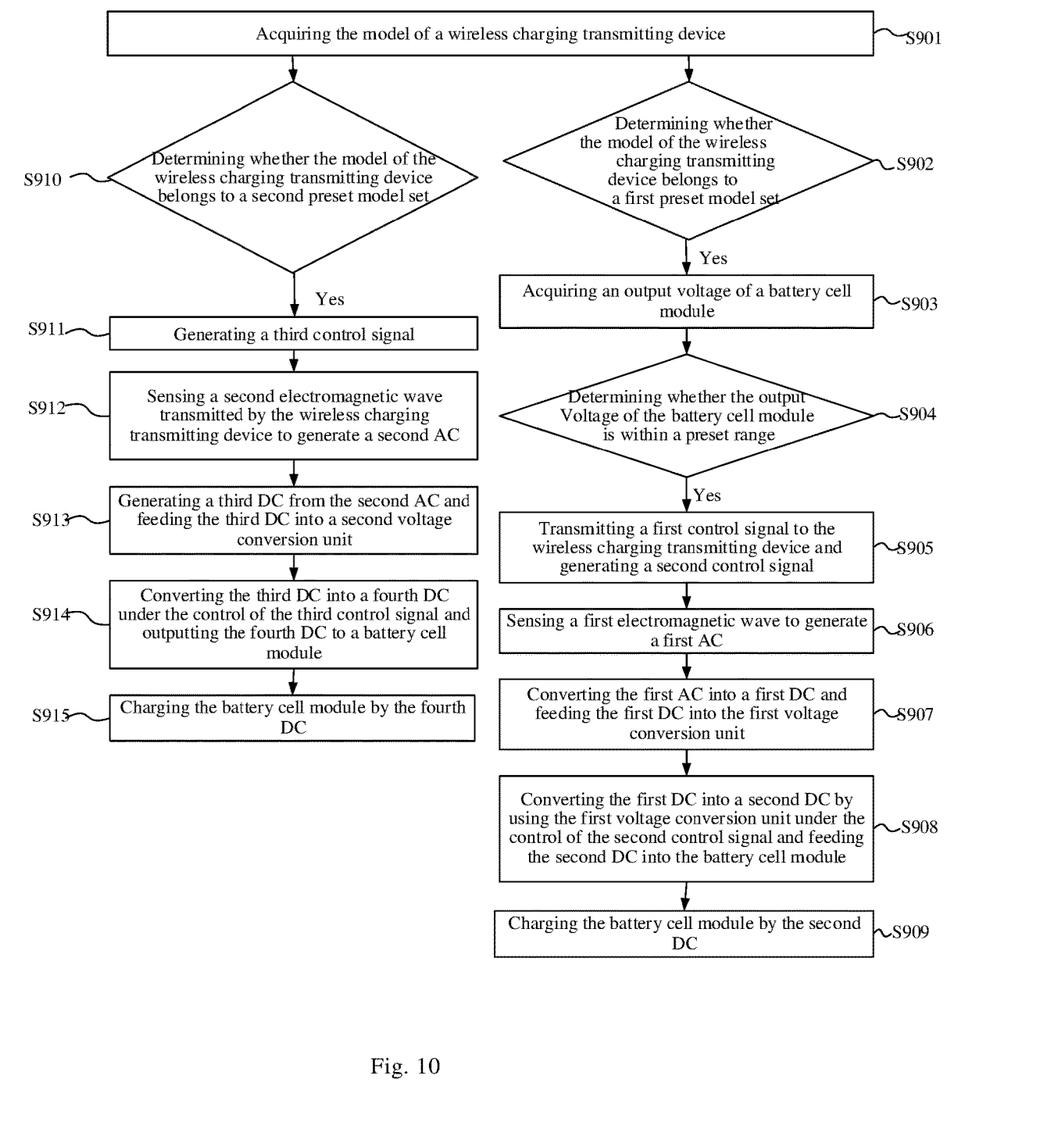
FIG. 10 is a second flowchart of a wireless charging method according to some embodiments of the present disclosure.

Optionally, referring to FIG. 10, the method further includes the following steps.

A step S910 includes: determining whether the wireless charging transmitting device is of a model belonging to a second preset model set.

In the step S910, if the wireless charging transmitting device is of a model belonging to the second preset model set, a step S911 is performed.

The step S911 includes: generating a third control signal. That is, in the case that the wireless charging transmitting device is of a model belonging to the second preset model set, the third control signal is generated.

A step S912 includes: sensing a second electromagnetic wave transmitted by the wireless charging transmitting device to generate a second AC.

A step S913 includes: generating a third DC from the second AC and feeding the third DC into a second voltage conversion unit.

A step S914 includes: converting the third DC into a fourth DC under the control of the third control signal and outputting the fourth DC to a battery cell module.

A voltage at an end of the second voltage conversion unit connected to the battery cell module is greater than a voltage at an end of the second voltage conversion unit connected to a rectifier-filter unit and is equal to a rated charging voltage of the battery cell module.

A step S915 includes: charging the battery cell module by the fourth DC.

Optionally, the third control signal includes a fifth scan signal and a sixth scan signal;

the second voltage conversion unit includes an inductor, a fifth transistor, a sixth transistor, and a second capacitor;

a first terminal of the inductor is connected to the rectifier-filter unit, and a second terminal of the inductor is connected to a first electrode of the fifth transistor and a first electrode of the sixth transistor;

a second electrode of the fifth transistor is connected to the battery cell module and a first electrode of the second capacitor, and the fifth scan signal is inputted at the gate electrode of the fifth transistor;

a second electrode of the sixth transistor is grounded, and the sixth scan signal is inputted at the gate electrode of the sixth transistor;

a second electrode of the second capacitor is grounded.

The converting the third DC into the fourth DC under the control of the third control signal and outputting the fourth DC to the battery cell module includes:

in a first phase, controlling, with the fifth scan signal, the fifth transistor to be off and controlling, with the sixth scan signal, the sixth transistor to be on; and in a second phase, controlling, with the fifth scan signal, the fifth transistor to be on and controlling, with the sixth scan signal, the sixth transistor to be off.

In the wireless charging method provided in some embodiments of the present disclosure, a first control signal is transmitted to a wireless charging transmitting device and a second control signal is generated in the case that the wireless charging transmitting device is of a model belonging to a first preset model set and an output voltage of a battery cell module is within a preset range; a first electromagnetic wave transmitted by the wireless charging transmitting device is then sensed to generate a first AC, and the first AC is converted into a first DC; the first DC is converted into a second DC by a first voltage conversion unit under the control of the second control signal, and finally the battery cell module is charged by the second DC. Since a voltage at an end of the first voltage conversion unit connected to the battery cell module is equal to the output voltage of the battery cell module in the embodiments of the present disclosure, firstly, it can be ensured that the wireless charging receiving device normally charges the battery cell module. Further, since the voltage at the end of the first voltage conversion unit connected to the battery cell module is greater than a voltage at an end of the first voltage conversion unit connected to the rectifier-filter unit, currents in a transmitting coil and the receiving coil can be reduced while a wireless charging power requirement is satisfied, so that energy losses in the transmitting coil and the receiving coil are reduced, thereby improving the efficiency of wireless charging. That is, in the embodiments of the present disclosure, it can be ensured that, while the wireless charging receiving device operates normally, energy losses in the transmitting coil and the receiving coil are reduced, thereby improving the efficiency of wireless charging.

Third Embodiment

The present disclosure provides in still another embodiment a terminal device. The terminal device includes the wireless charging receiving device provided in the foregoing embodiments.

The terminal device provided in the embodiments of the present disclosure may be specifically a terminal device such as a mobile phone, a tablet computer, a notebook computer, a UMPC, a net book, a PDA, a smartwatch or a smart wristband. Optionally, the terminal device may be another type of terminal device. This is not limited in the embodiments of the present disclosure.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes" or "including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., a read-only memory (ROM)/random access memory (RAM), a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A wireless charging receiving device, comprising a control unit, a receiving coil, a rectifier-filter unit, a first voltage conversion unit, and a battery cell module, wherein
the control unit is connected to the first voltage conversion unit and is configured to transmit a first control signal to a wireless charging transmitting device and output a second control signal to the first voltage conversion unit in a case that the wireless charging transmitting device is of a model belonging to a first preset model set and an output voltage of the battery cell module is within a preset range, wherein the first control signal is used for instructing the wireless charging transmitting device to transmit a first electromagnetic wave;
the receiving coil is connected to the rectifier-filter unit and is configured to sense the first electromagnetic wave to generate a first alternating current (AC) and feed the first AC into the rectifier-filter unit;
the rectifier-filter unit is configured to convert the first AC into a first direct current (DC) and feed the first DC into the first voltage conversion unit;

the first voltage conversion unit is configured to convert the first DC into a second DC under the control of the second control signal and feed the second DC into the battery cell module, wherein a voltage at an end of the first voltage conversion unit connected to the battery cell module is greater than a voltage at an end of the first voltage conversion unit connected to the rectifier-filter unit, and is equal to the output voltage of the battery cell module; and the battery cell module is connected to a ground terminal and is charged by the second DC;

wherein the wireless charging receiving device further comprises a second voltage conversion unit;

the control unit is further configured to output a third control signal to the second voltage conversion unit in a case that the wireless charging transmitting device is of a model belonging to a second preset model set;

the receiving coil is further configured to sense a second electromagnetic wave transmitted by the wireless charging transmitting device to generate a second AC and feed the second AC into the rectifier-filter unit;

the rectifier-filter unit is further configured to convert the second AC into a third DC and feed the third DC into the second voltage conversion unit;

the second voltage conversion unit is configured to convert the third DC into a fourth DC under the control of the third control signal and output the fourth DC to the battery cell module, wherein a voltage at an end of the second voltage conversion unit connected to the battery cell module is greater than a voltage at an end of the second voltage conversion unit connected to the rectifier-filter unit and is equal to a rated charging voltage of the battery cell module; and the battery cell module is further charged by the fourth DC.

2. The wireless charging receiving device according to claim 1, wherein the second control signal comprises a first transistor control signal, a second transistor control signal, a third transistor control signal, and a fourth transistor control signal;

the first voltage conversion unit comprises a first transistor, a second transistor, a third transistor, a fourth transistor, and a first capacitor;

a first electrode of the first transistor is connected to the rectifier-filter unit, a second electrode of the first transistor is connected to a first electrode of the first capacitor and a first electrode of the second transistor, and a gate driving signal of the first transistor is the first transistor control signal;

a second electrode of the second transistor is connected to the battery cell module and a first electrode of the third transistor, and a gate driving signal of the second transistor is the second transistor control signal;

a second electrode of the third transistor is connected to a second electrode of the first capacitor and a first electrode of the fourth transistor, and a gate driving signal of the third transistor is the third transistor control signal; and a second electrode of the fourth transistor is grounded, and a gate driving signal of the fourth transistor is the fourth transistor control signal.

3. The wireless charging receiving device according to claim 1, wherein the voltage at the end of the first voltage conversion unit connected to the battery cell module is twice the voltage at the end of the first voltage conversion unit connected to the rectifier-filter unit.

4. The wireless charging receiving device according to claim 1, wherein the battery cell module comprises n battery cells connected in series, n is an integer greater than or equal to 2.

5. The wireless charging receiving device according to claim 1, wherein the third control signal comprises a fifth transistor control signal and a sixth transistor control signal;

the second voltage conversion unit comprises an inductor, a fifth transistor, a sixth transistor, and a second capacitor;

a first terminal of the inductor is connected to the rectifier-filter unit, and a second terminal of the inductor is connected to a first electrode of the fifth transistor and a first electrode of the sixth transistor;

a second electrode of the fifth transistor is connected to the battery cell module and a first electrode of the second capacitor, and the fifth transistor control signal is inputted at a gate electrode of the fifth transistor;

a second electrode of the sixth transistor is grounded, and the sixth transistor control signal is inputted at a gate electrode of the sixth transistor; and a second electrode of the second capacitor is grounded.

6. A wireless charging system, comprising a wireless charging transmitting device and the wireless charging receiving device according to claim 1.

7. A terminal device, comprising the wireless charging receiving device according to claim 1.

8. The wireless charging system according to claim 6, wherein the second control signal comprises a first transistor control signal, a second transistor control signal, a third transistor control signal, and a fourth transistor control signal;

the first voltage conversion unit comprises a first transistor, a second transistor, a third transistor, a fourth transistor, and a first capacitor;

a first electrode of the first transistor is connected to the rectifier-filter unit, a second electrode of the first transistor is connected to a first electrode of the first capacitor and a first electrode of the second transistor, and a gate driving signal of the first transistor is the first transistor control signal;

a second electrode of the second transistor is connected to the battery cell module and a first electrode of the third transistor, and a gate driving signal of the second transistor is the second transistor control signal;

a second electrode of the third transistor is connected to a second electrode of the first capacitor and a first electrode of the fourth transistor, and a gate driving signal of the third transistor is the third transistor control signal; and a second electrode of the fourth transistor is grounded, and a gate driving signal of the fourth transistor is the fourth transistor control signal.

9. The wireless charging system according to claim 6, wherein the voltage at the end of the first voltage conversion unit connected to the battery cell module is twice the voltage at the end of the first voltage conversion unit connected to the rectifier-filter unit.

10. The wireless charging system according to claim 6, wherein the battery cell module comprises n battery cells connected in series, n is an integer greater than or equal to 2.

11. The wireless charging system according to claim 6, wherein the third control signal comprises a fifth transistor control signal and a sixth transistor control signal;

the second voltage conversion unit comprises an inductor, a fifth transistor, a sixth transistor, and a second capacitor;

a first terminal of the inductor is connected to the rectifier-filter unit, and a second terminal of the inductor is connected to a first electrode of the fifth transistor and a first electrode of the sixth transistor;

a second electrode of the fifth transistor is connected to the battery cell module and a first electrode of the second capacitor, and the fifth transistor control signal is inputted at a gate electrode of the fifth transistor;

a second electrode of the sixth transistor is grounded, and the sixth transistor control signal is inputted at a gate electrode of the sixth transistor; and a second electrode of the second capacitor is grounded.

12. The terminal device according to claim 7, wherein the second control signal comprises a first transistor control signal, a second transistor control signal, a third transistor control signal, and a fourth transistor control signal;

the first voltage conversion unit comprises a first transistor, a second transistor, a third transistor, a fourth transistor, and a first capacitor;

a first electrode of the first transistor is connected to the rectifier-filter unit, a second electrode of the first transistor is connected to a first electrode of the first capacitor and a first electrode of the second transistor, and a gate driving signal of the first transistor is the first transistor control signal;

a second electrode of the second transistor is connected to the battery cell module and a first electrode of the third transistor, and a gate driving signal of the second transistor is the second transistor control signal;

a second electrode of the third transistor is connected to a second electrode of the first capacitor and a first electrode of the fourth transistor, and a gate driving signal of the third transistor is the third transistor control signal; and a second electrode of the fourth transistor is grounded, and a gate driving signal of the fourth transistor is the fourth transistor control signal.

13. The terminal device according to claim 7, wherein the voltage at the end of the first voltage conversion unit connected to the battery cell module is twice the voltage at the end of the first voltage conversion unit connected to the rectifier-filter unit.

14. The terminal device according to claim 7, wherein the battery cell module comprises n battery cells connected in series, n is an integer greater than or equal to 2.

15. A wireless charging method, comprising:
transmitting a first control signal to a wireless charging transmitting device and generating a second control signal in a case that the wireless charging transmitting device is of a model belonging to a first preset model set and an output voltage of a battery cell module is within a preset range, wherein the first control signal is used for instructing the wireless charging transmitting device to transmit a first electromagnetic wave;

sensing the first electromagnetic wave to generate a first alternating current (AC);

converting the first AC into a first direct current (DC) by using a rectifier-filter unit and feeding the first DC into a first voltage conversion unit;

converting the first DC into a second DC by using the first voltage conversion unit under the control of the second control signal, and feeding the second DC into the battery cell module, wherein a voltage at an end of the first voltage conversion unit connected to the battery cell module is greater than a voltage at an end of the first voltage conversion unit connected to the rectifier-filter unit and is equal to the output voltage of the battery cell module; and charging the battery cell module by the second DC;

wherein the method further comprises:

generating a third control signal in a case that the wireless charging transmitting device is of a model belonging to a second preset model set;

sensing a second electromagnetic wave transmitted by the wireless charging transmitting device to generate a second AC;

converting the second AC into a third DC by using the rectifier-filter unit and feeding the third DC into a second voltage conversion unit;

converting the third DC into a fourth DC by using the second voltage conversion unit under the control of the third control signal and outputting the fourth DC to the battery cell module, wherein a voltage at an end of the second voltage conversion unit connected to the battery cell module is greater than a voltage at an end of the second voltage conversion unit connected to the rectifier-filter unit and is equal to a rated charging voltage of the battery cell module; and charging the battery cell module by the fourth DC.

16. The terminal device according to claim 7, wherein the third control signal comprises a fifth transistor control signal and a sixth transistor control signal;

the second voltage conversion unit comprises an inductor, a fifth transistor, a sixth transistor, and a second capacitor;

a first terminal of the inductor is connected to the rectifier-filter unit, and a second terminal of the inductor is connected to a first electrode of the fifth transistor and a first electrode of the sixth transistor;

a second electrode of the fifth transistor is connected to the battery cell module and a first electrode of the second capacitor, and the fifth transistor control signal is inputted at a gate electrode of the fifth transistor;

a second electrode of the sixth transistor is grounded, and the sixth transistor control signal is inputted at a gate electrode of the sixth transistor; and a second electrode of the second capacitor is grounded.

* * * * *